(12) United States Patent
Howard

(10) Patent No.: US 8,621,779 B1
(45) Date of Patent: Jan. 7, 2014

(54) GREENHOUSE UTILIZING WASTE HEAT SOURCE

(76) Inventor: Barry Howard, Chicago, IL (US)

( * ) Notice: Subject to any disclaimer, the term of this patent is extended or adjusted under 35 U.S.C. 154(b) by 331 days.

(21) Appl. No.: 13/064,100

(22) Filed: Mar. 7, 2011

(51) Int. Cl.
*A01G 9/14* (2006.01)

(52) U.S. Cl.
USPC .......................................................... 47/17

(58) Field of Classification Search
USPC .......................................................... 47/17
See application file for complete search history.

(56) References Cited

U.S. PATENT DOCUMENTS

| | | | |
|---|---|---|---|
| 4,166,339 A * | 9/1979 | Heller et al. ............... | 47/17 |
| 4,289,116 A * | 9/1981 | Williams .................. | 126/633 |
| 4,462,390 A * | 7/1984 | Holdridge et al. .......... | 126/587 |
| 4,567,732 A | 2/1986 | Landstrom et al. | |
| 4,685,617 A | 8/1987 | Assaf | |
| 4,699,316 A | 10/1987 | Johnson | |
| 5,758,717 A | 6/1998 | Crossman | |
| 6,205,704 B1 | 3/2001 | Schmitz et al. | |
| 6,446,385 B1 | 9/2002 | Crutcher | |
| 6,575,234 B2 | 6/2003 | Nelson | |
| 7,392,615 B2 * | 7/2008 | Lee ........................... | 47/58.1 SC |
| 2006/0107587 A1 | 5/2006 | Bullinger et al. | |
| 2008/0035036 A1 | 2/2008 | Bassani et al. | |
| 2009/0301399 A1 * | 12/2009 | Brown et al. ............... | 119/226 |
| 2010/0031893 A1 | 2/2010 | Bodlovich et al. | |
| 2010/0199555 A1 | 8/2010 | Pole | |

* cited by examiner

*Primary Examiner* — Kristen C Hayes
(74) *Attorney, Agent, or Firm* — Harbin & Hein PLLC

(57) ABSTRACT

A method and apparatus for growing plants in a heated environment. One aspect of the invention provides an apparatus for growing plants in a heated environment, with the apparatus comprising a greenhouse, a waste heat source provided to heat the greenhouse, and a radiant heat system that heats the greenhouse using the waste heat from the waste heat source. The greenhouse may be in or upon a rooftop, a space adjacent to a factory, a space adjacent to an urban store, or a space adjacent to a suburban store. In a preferred embodiment, the plants are grown hydroponically. In a different aspect, the radiant heat system uses a food grade heat transfer fluid. In another preferred embodiment, the waste heat source is a smokestack. For other embodiments, the radiant heat system resides in a floor and/or the sides of the greenhouse.

6 Claims, 2 Drawing Sheets

GREENHOUSE UTILIZING WASTE HEAT SOURCE

BACKGROUND OF INVENTION

The invention relates to a heating system and method for a greenhouse.

There is a growing movement in the United States for fresh foods grown in a sustainable way. In particular, urban and suburban residents are becoming more aware of where their food is being grown and how it is being grown. Furthermore, many of these residents are concerned with the high amount of carbon emissions resulting from growing and transporting the food and the effect the emissions have on the environment. This movement, called here the local food movement, has created significant demand for fresh, local, sustainable foods.

Farmers' markets, where farmers truck in their produce from distant farm fields, are now common in many cities and profitable for the farmers despite the cost of hauling their food from distant locations. Similarly, many urban restaurants pay significant sums to have fresh produce hauled daily to their restaurant. But there are significant environmental costs to this, as the transportation process is expensive in both dollars and pollution, especially carbon emissions.

Furthermore, the lack of direct access to fresh produce is more than just a commercial concern. Reliable access to fresh produce is important should a natural or man-made disaster strike a city. Indeed, urban officials view food security as an important modern-day issue. For example, in cold weather climates like Chicago, blizzards can make roads impassable for days, causing food shortages. A nearby, home-grown source of produce is important to keeping people fed. Relatedly, in the inner city entire neighborhoods are regularly without fresh produce, even without such disasters. Urban officials refer to these areas as "urban deserts." The lack of good nutrition from fresh produce causes a whole host of human developmental issues.

The high urban (and many suburban) land costs, however, prevent the food from being grown closer to the urban and many suburban consumers. It is usually more profitable to build a skyscraper on a city lot than to grow tomatoes on that lot.

Another problem with the current agricultural system is that in cold weather climates, such as Chicago, produce cannot be locally grown year round. Farmers' markets operate only during good weather, when crops can be sewn and harvested. And urban restaurants accordingly must have the produce flown in or trucked in from warm weather climates, which is expensive in dollar and environmental costs.

For cold weather climates, one solution is to use a greenhouse to grow produce year round. But that is an expensive proposition. Heating a greenhouse is one of the largest operating costs for such a business and usually results in an unprofitable venture or at least very expensive produce. Additionally, such heating is not environmentally friendly, as it generally consumes fossil fuels and adds to carbon emissions, among other problems.

Accordingly, it would be of great value to grow produce economically and locally in a cold weather urban or suburban environment on a year-round basis. The invention accomplishes this.

SUMMARY OF INVENTION

According to an aspect of the invention, there is provided an apparatus for growing plants in a heated environment, with the apparatus comprising a greenhouse situated upon or adjacent a building having heating equipment, a waste heat source emanating from the heating equipment, and a means for extracting and supplying radiant heat from the waste heat source for heating the greenhouse. The greenhouse may be located on a rooftop, a space adjacent to a factory, a space adjacent to an urban store, or a space adjacent to a suburban store. In another embodiment, the plants are grown hydroponically. In yet another aspect of the invention, the radiant heat system uses a food grade heat transfer fluid. In other aspects of the invention, the waste heat source is a smoke stack. For other embodiments, the radiant heat system is in the greenhouse's floor or the greenhouse's floor and sides.

Thus, the invention provides an advantage in that plants can be sustainably and profitably grown year-round in an urban or suburban environment with no added carbon emissions from heating the greenhouse.

DETAILED DESCRIPTION

Figure 1:
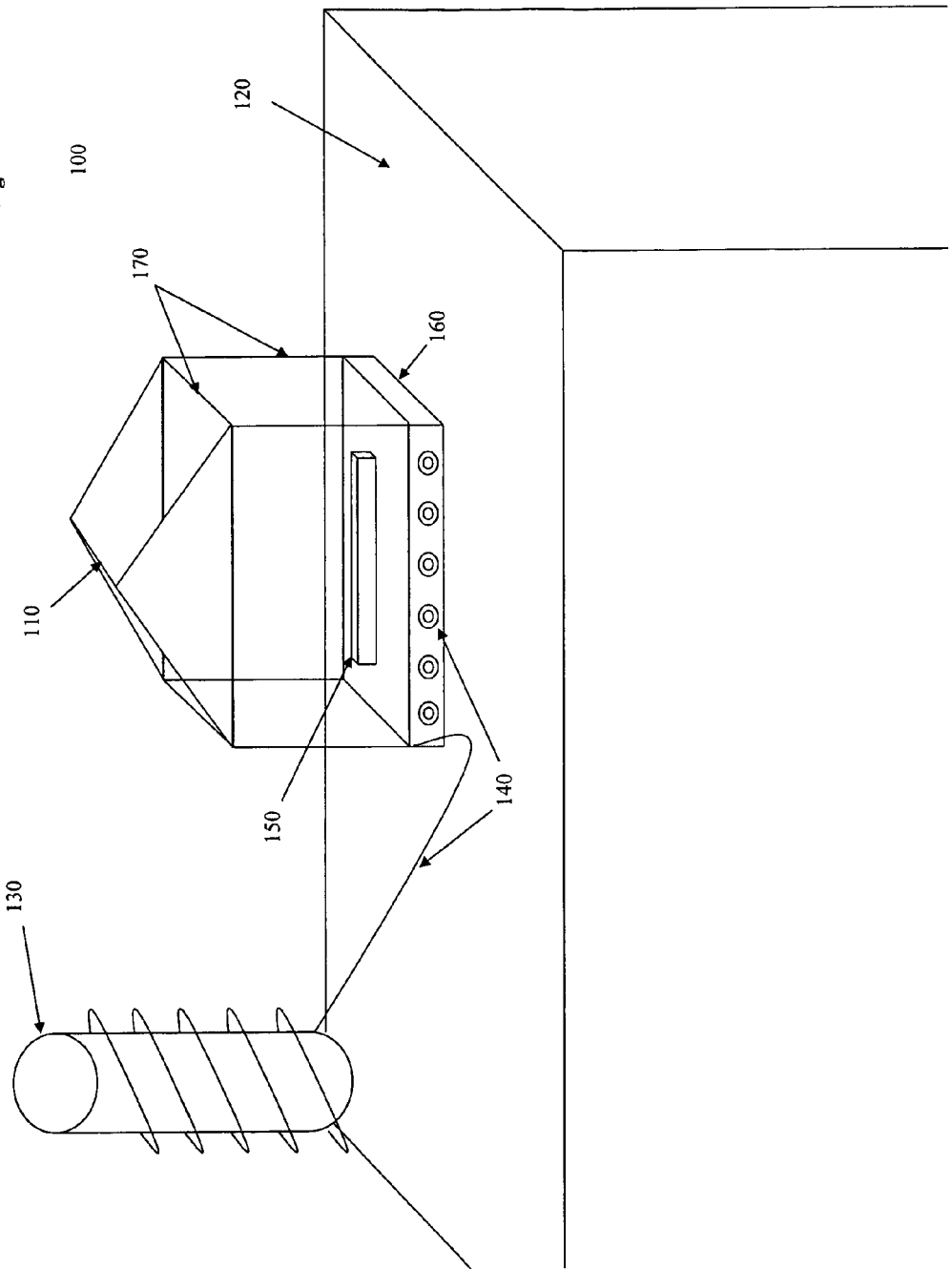
FIG. 1 shows an apparatus according to a preferred embodiment of the invention.

A greenhouse according to an embodiment of the invention is shown in FIG. 1. The apparatus 100 comprises a greenhouse 110, building upon which the greenhouse is located 120, a waste heat source to heat the greenhouse 130, and a radiant heat system 140 for heating the greenhouse with the waste heat source.

In the pictured embodiment, the greenhouse 110 is a standard commercial one as generally known in the art. The building upon which the greenhouse sits 120 in FIG. 1 is a rooftop. Rooftops are common in urban environments and are often open spaces that go unused for productive activity. Other embodiments contemplate placing the greenhouse on spaces next to factories in urban environments, urban stores, or suburban stores. Like rooftops, these are all spaces that often go unused. Rather than let these spaces go to waste, the invention converts these into commercially viable areas. Furthermore, one of the largest costs to growing produce in an urban environment is the land cost. And space on a rooftop can often be acquired at prices and rates that make growing produce a commercially feasible option. The greenhouse 110 can be of different sizes, depending on the size of the rooftop or other land on which the greenhouse sits 120.

The greenhouse 110 in the pictured embodiment is placed near a waste heat source 130, here a smoke stack, whose emitted heat is used to heat the greenhouse 110. The waste heat source must have enough heat to heat sufficiently the greenhouse via the radiant heat transfer means (described below). The exact distance of the greenhouse from the waste heat source is not critical, but the greenhouse cannot be so far away from the waste heat source that the heat source cannot adequately heat the greenhouse to grow the produce.

The invention contemplates using other waste heat sources, but smoke stacks tend to be common in urban environments and tend to have sufficient thermal energy to heat a rooftop greenhouse via a radiant heat source, and so this is a preferred waste heat source for heating the greenhouse. Smoke stacks emit heat that is dissipated into the atmosphere and not used for productive means; essentially, it is a wasted resource. The invention uses the waste heat emanating from the smoke stack to provide a heating capability to a greenhouse. Such waste heat can often be supplied at little or no cost to heat the greenhouse, and so again helps make growing produce in an urban environment a commercially feasible option.

A radiant heat transfer means 140 transfers the heat from the waste heat source 130 to the greenhouse 110. FIG. 1 shows a preferred embodiment of the invention in which a smoke stack is externally wrapped with radiant heating tubes that use a heat transfer fluid to transfer the heat to the greenhouse 110. Such heating tubes and means of connecting them to a smoke stack are commonly known to one of skill in the art. The heat transfer fluid may be a food grade heat transfer fluid as is commonly known in the art, which may be needed if the greenhouse is located on or near a food producing factory and for growing edible plants. In one embodiment, the radiant heat transfer means is placed in the floor 160 of the greenhouse 110. But the radiant heat transfer means can, preferably, line the floor 160 and the sides of the greenhouse 170, which promotes even heating and allows for a greater variety of crops to be grown. Accordingly, in the pictured embodiment, the greenhouse is heated from the floor 160 and the sides 170.

In a preferred embodiment, the plants 150 are grown hydroponically. In other embodiments, the plants can be grown in soil. But transporting soil to the top of a rooftop can be difficult, and soil can often harbor plant viruses and bacteria. The invention contemplates using hydroponic production means as are commonly known to those of skill in the art.

Figure 2:
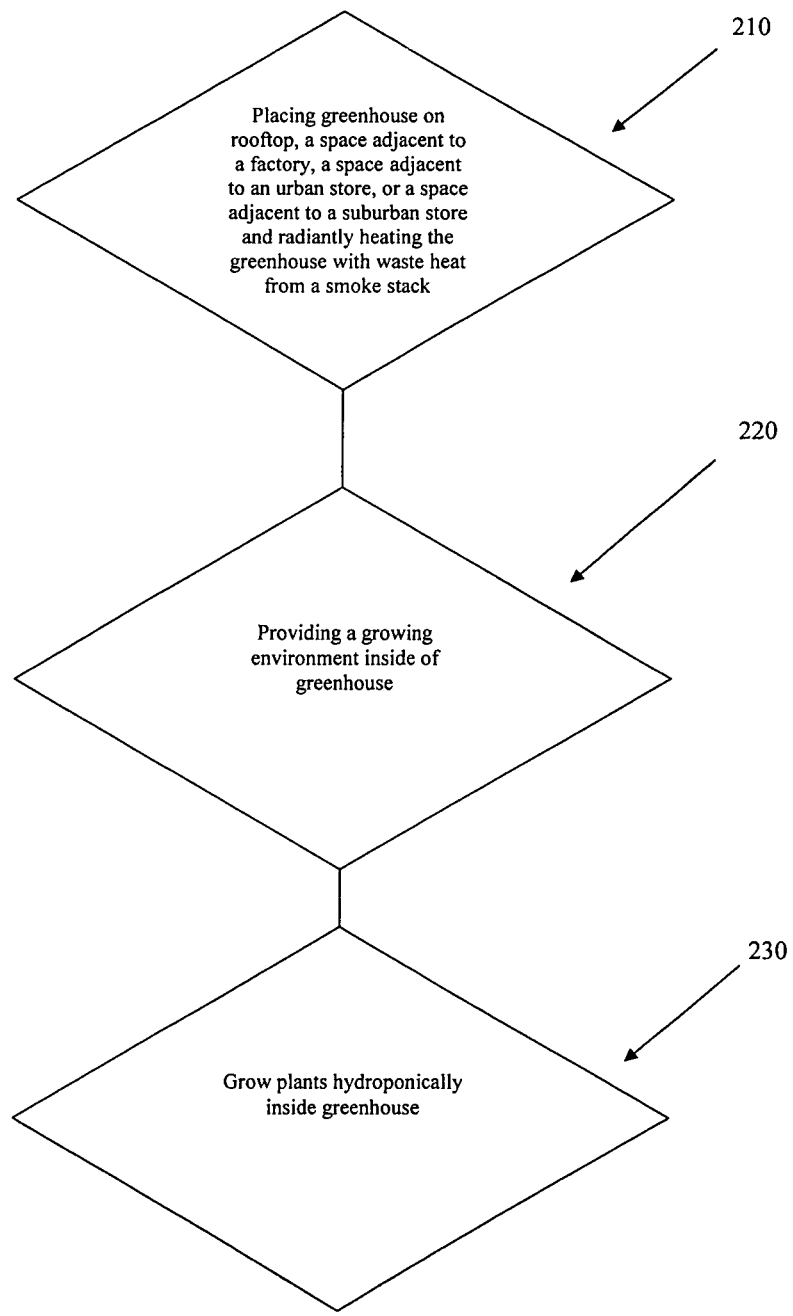
FIG. 2 shows a flow chart for growing plants according to an embodiment of the invention.

FIG. 2 describes growing produce according to a preferred method of the invention. A greenhouse is placed on a rooftop, space adjacent to an urban factory, space adjacent to an urban store, or space adjacent to a suburban store and is radiantly heated with waste heat from a smokestack 210. As previously described, this radiant heat source may be located in or under the floor of the greenhouse or the sides of the greenhouse. In 220, a growing environment is provided inside the greenhouse. In 230, plants are grown hydroponically in the greenhouse.

The foregoing descriptions of specific embodiments of the present invention are presented for illustrative purposes. They are not intended to be exhaustive or to limit the invention to the precise forms disclosed. To one of skill in the art, many modifications and variations will be evident in light of the above teachings.

I claim:

1. A method for growing plants in a heated environment, the method comprising:
    providing a building structure having heating equipment;
    venting heat from said heating equipment to an external environment wherein vented heat is waste heat from said building structure;
    extracting said vented heat in a radiant manner during said venting step, wherein said extracting is performed with heat exchange tubes wrapped around said heating equipment and wherein said extracting is performed with a food grade heat transfer fluid other than water;
    supplying said radiant heat to a greenhouse on a rooftop; and
    providing a growing environment in said greenhouse to grow plants.

2. The method according to claim 1, further comprising hydroponically growing said plants.

3. The method according to claim 1, wherein said venting step utilizes a smoke stack.

4. The method according to claim 1, wherein said supplying step further comprises providing said radiant heat through a floor of said greenhouse.

5. The method according to claim 1, wherein said supplying step further comprises providing said radiant heat through a floor and side of said greenhouse.

6. A method for growing plants in a heated environment, the method comprising:
    a. radiantly heating with waste heat from a smokestack a greenhouse located upon a rooftop, wherein said waste heat is extracted from said smokestack via heat exchange tubes wrapped around said smokestack;
    b. providing a growing environment inside said greenhouse, and
    c. growing plants hydroponically inside said greenhouse.

* * * * *